(12) United States Patent
Lange et al.

(10) Patent No.: US 7,987,060 B2
(45) Date of Patent: Jul. 26, 2011

(54) IDENTIFYING PEAKS IN MASS SPECTROMETRY DATA

(75) Inventors: Oliver Lange, Bremen (DE); Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 618 days.

(21) Appl. No.: 11/791,647

(22) PCT Filed: Nov. 23, 2005

(86) PCT No.: PCT/US2005/042714
§ 371 (c)(1),
(2), (4) Date: Apr. 28, 2008

(87) PCT Pub. No.: WO2006/058198
PCT Pub. Date: Jun. 1, 2006

(65) Prior Publication Data
US 2008/0270083 A1 Oct. 30, 2008

(30) Foreign Application Priority Data
Nov. 29, 2004 (GB) .................................. 0426174.9

(51) Int. Cl.
*G06F 17/40* (2006.01)
*G06F 17/00* (2006.01)

(52) U.S. Cl. ............... 702/77; 702/76; 702/23; 702/32; 250/282

(58) Field of Classification Search .............. 702/77, 702/23, 28, 32, 76
See application file for complete search history.

(56) References Cited

U.S. PATENT DOCUMENTS

| | | | |
|---|---|---|---|
| 4,755,670 A | 7/1988 | Syka et al. | |
| 4,761,545 A * | 8/1988 | Marshall et al. | 250/291 |
| 5,175,430 A | 12/1992 | Enke et al. | |
| 5,418,826 A * | 5/1995 | Sato et al. | 378/48 |

(Continued)

FOREIGN PATENT DOCUMENTS
GB  2 410 123 A  7/2005
(Continued)

OTHER PUBLICATIONS

D. Alan Hanna, "FTMS Noise Characterization," Preceedings of the ASMS Conference on Mass Spectrometry and Allied Topics, p. 435-436, (May 26, 1985).

(Continued)

*Primary Examiner* — Hal D Wachsman
(74) *Attorney, Agent, or Firm* — Charles B. Katz; Pamela Lau Kee

(57) ABSTRACT

A method of processing Fourier Transform Mass Spectrometry (FTMS) data includes performing a Fourier Transform of a part of a time domain transient and identifying from that transformed data signal peaks representative of the presence of ions. After peak identification, the full transient is then transformed, and the peaks identified in the partial transient transform are used to locate true peaks in the transformed full transient. The number of 'false' peaks resulting from random noise has been found to correlate to the resolution, so that using a partial transient to identify true peaks reduces the risk of false peaks being included; nevertheless this information can then be applied to the full data set when transformed. As an alternative, different parts of the full data set can be transformed and then correlated; because any noise will be random, false peaks should occur at different places in the two partial transforms.

23 Claims, 8 Drawing Sheets

U.S. PATENT DOCUMENTS

| | | | |
|---|---|---|---|
| 5,886,346 | A | 3/1999 | Makarov |
| 5,995,989 | A | 11/1999 | Gedcke et al. |
| 6,403,955 | B1* | 6/2002 | Senko .......................... 250/292 |
| 2003/0042414 | A1* | 3/2003 | Smith et al. .................. 250/282 |
| 2004/0195500 | A1* | 10/2004 | Sachs et al. .................. 250/282 |

FOREIGN PATENT DOCUMENTS

| | | |
|---|---|---|
| WO | WO 2004/097581 A2 | 11/2004 |
| WO | WO 2005/031791 A2 | 4/2005 |

OTHER PUBLICATIONS

D. Alan Hanna, "Noise Analysis for FTMS Spectra," Proceedings of the 10th International Mass Spectometry Conference, p. 1211-1212, (May 26, 1985).

Alan G. Marshall, "Fourier Transform Ion Cyclotron Resonance Mass Spectrometry: A primer," Mass Spectrometry Reviews, vol. 17 (No. 1), p. 1-35, (May 6, 1998).

Alan G. Marshall, "Milestones in Fourier Transform Ion Cyclotron Resonance Mass Spectrometry Technique Development," J.Mass Spectrom., vol. 200 ( No. 1-3), p. 331-356, (2000).

F. R. Verdun et al., "Effects of Noise, Time-Domain Damping, Zero-Filling and the FFT Algorithm on the 'Exact' Interpolation of Fast Fourier Transform Spectra," Applied Spectroscopy USA, vol. 42 (No. 5), pp. 715-721, (1988).

A. Makarov et., "Dynamic Range of Mass Accuracy in LTQ Orbitrap Hybrid Mass Spectrometer," Journal of the American Society of Mass Spectrometry, Elsevier Science Inc. (US), vol. 17 (No. 7), pp. 977-982, (2006).

P. Kaur et al., "Algorithms for Automatic Interpretation of High Resolution Mass Spectra," Journal of the American Society for Mass Spectrometry, Elsevier Science Inc. (US), vol. 17 (No. 3), pp. 459-468, (2006).

S. Hofstadler et al., "Isotopic Beat Patterns in Fourier Transform Ion Cyclotron Resonance Mass Spectrometry: Implications for High Resolution Mass Measurements of Large Biopolymers," International Journal of Mass Spectrometry and Ion Processes, vol. 132 (No. 1-2), pp. 109-127, (1994).

D. Alan Hanna, "FTMS Noise Characterization," Proc. 33rd Annual Conference on Mass Spectrometry and Allied Topics; San Diego, ASMS, 1985, pp. 435-436.

D. Alan Hanna, "Noise Analysis for FTMS Spectra," Advances in Mass Spectrometry 1985: Proceedings of the 10th International Mass Spectrometry Conference, John Wiley and Sons Ltd., 1985, pp. 1211-1212.

W. H. Benner, "A Gated Electrostatic Ion Trap to Repetitiously Measure the Charge and m/z of Large Electrospray Ions," Analytical Chemistry, 1997, 69, pp. 4162-4168.

Brock et al., "Hadamard Transform Time-of-Flight Mass Spectrometry," Analytical Chemistry, 1998, 70, pp. 3735-3741.

* cited by examiner

IDENTIFYING PEAKS IN MASS SPECTROMETRY DATA

BACKGROUND OF THE INVENTION

This invention relates to a method of processing mass spectrometry data, particularly but not exclusively data obtained from Fourier Transform Ion Cyclotron Resonance Mass Spectrometry (FTMS).

Spectrometry in general, and mass spectrometry in particular, produces extremely rich data sets. This is especially true for high-resolution mass spectrometry data such as those obtained using double focussing magnetic sector mass spectrometry, time-of-flight mass spectrometry and Fourier transform mass spectrometry (FTMS). For example, a standard acquisition from m/z 200-2000 in FTMS involves the measurement of one million data points. Measuring one scan per second (typical for liquid chromatography/mass spectrometry (LC/MS) applications) results in the generation of raw data at a rate of 7.2 GB/hour (approximately 170 GB/day).

Typically, these spectra are stored in a computer memory or an alternative computer readable medium and a large amount of memory is thus required for storage. The bulk of such spectrometry data (perhaps 99%) does not contain valuable information but instead mostly comprises noise which is of no analytical value besides its overall amplitude and standard deviation.

Currently, mass spectrometers will either store the entire data set or may try to reduce the size of the data set in one of two ways.

The first is merely to store a list of peaks found in a mass spectrum (i.e. to store the position and magnitude of each peak). This method has the disadvantage that it is impossible for a user or software to re-evaluate data for further characteristics such as peak shape, background, signal-to-noise ratio or other information that cannot be generated without additional assumptions. Information about the non-peak part of a spectrum is very valuable when information is processed further either manually or automatically. The signal-to-noise ratio gives important hints about the significance of an event. In addition, groups of peaks are very helpful to the skilled user who can evaluate spectra with far greater skill than mere automatic processing of the location and intensity of peaks within a group.

A second method of reducing the size of data file to be stored is achieved by an operator pre-selecting a threshold value and software storing only data points of a spectrum whose value is greater than this threshold. If the operator guesses the threshold value correctly, only data points belonging to peaks will be stored. This has the advantage of preserving information about peak shape. However, this method has the disadvantage that it relies upon the skill of an operator to set the threshold level correctly. If the threshold level is set too low, typically a large quantity of noise data points will be stored along with peak data points and, if the threshold is set too high, valuable information relating to peak shape will be lost as data points of the base of peaks will be missed. Accordingly, such software is difficult for anyone other than an experienced operator to use successfully. In addition, no information relating to noise is stored such that all such information is lost.

An improvement to the analysis of noise in FTMS data is described by Hanna in "Advances in Mass Spectrometry 1985: proceedings of the 10th International Mass Spectrometry Conference", Swansea, 9-13 Sep. 1985, John Wiley and Sons, and separately in the Proceedings of the ASMS 33rd Annual Conference on Mass Spectrometry and Allied Topics, May 26-31, 1985, San Diego, Calif., USA. The method that Hanna describes uses a statistical analysis of the noise present in an FTMS mass spectrum to obtain a threshold value that is used as a noise exclusion level for the spectrum. Peak lists are obtained from data above this threshold. Whilst the techniques described in the Hanna articles allow a better estimate of a suitable noise threshold to be achieved, they do still suffer from several drawbacks. Firstly, the techniques only result in the determination of peak locations and their intensity, and the valuable information regarding both the peak shape and the spectral noise are lost. Secondly, the techniques are computationally relatively expensive, since, to obtain the parameters of the noise distribution, several iterations are necessary until these parameters stabilise.

SUMMARY OF THE INVENTION

Against this background, and from a first aspect, the present invention resides in a method of processing Fourier Transform Mass Spectrometry data, comprising: (a) obtaining a set of FTMS data in the time domain in respect of a mass to charge ratio range; (b) transforming a subset of that obtained time domain data into the frequency domain; (c) applying a first threshold to the frequency domain data subset to discriminate noise data from peak data indicative of the presence of ions having a mass to charge ratio with the range; (d) transforming substantially the full data set of the obtained time domain data into the frequency domain; and (e) identifying regions within that transformed full data set which correspond with the regions of the transformed data subset identified in the step (c) to contain peak data.

The processing technique of this aspect of the invention permits improved discrimination against random noise, whether to remove random noise spikes at a "standard" threshold, in order to compress the data file to be stored, or to locate smaller real signals using a lower threshold (but where the data file may not be compressed). The invention is based on the observation that, as the resolution is increased (equivalent to the number of time domain data points), the number of random noise peaks found above a threshold increases, but with little or no increase in the number of "real" signal peaks, that is, peaks which genuinely represent the presence of ions having a mass to charge ratio within the selected range. The opposite is also true: as the resolution decreases, the number of random peaks also reduces. In fact, it has been found that the number of real signal peaks is relatively constant at all resolutions. This is because, assuming that the random noise is Gaussian distributed, the more data points are present, the more of these there will be above any given threshold. The number of frequency domain data points is proportional to the number of time domain data points. Therefore, a smaller time domain data set produces fewer random noise peaks, and this can be used as a basis to threshold the full data set.

By transforming only a fraction of a full FTMS data set in the time domain into the frequency domain, a relatively small number of false peaks will be located at a given threshold because of the reduced resolution. Once the peaks which extend above the threshold have been identified (in preference, the location of such peaks), the full data set may be transformed but only the data around the locations previously identified at the lower resolution need be analysed and/or saved. In other words, the problem of the larger number of false peaks that would be found if the threshold were just applied to the full data set in the frequency domain is avoided, because the false peaks can be ignored as a result of the prior threshold application at the lower resolution.

In one embodiment, substantially all of the data from the full transform may be displayed and/or stored, but only in the region(s) identified in the transform of the partial transient to be "real" data (because they are above the first threshold). In other words, no second intensity threshold need be applied to the full transform, and the total quantity of data, for example, is reduced primarily by identifying frequency/mass ranges within the scanned range that contain only noise data (through the application of the first threshold to the partial transient transform), and simply rejecting these corresponding regions in the full transient transform. In an additional or alternative embodiment, however, a second threshold may be applied to the data in the full transient transform, with only data above that second threshold being kept for display, storage etc. That second threshold may be the same or may be different to the first threshold.

In accordance with a second aspect of the present invention, there is provided a method of processing Fourier Transform Mass Spectrometry (FTMS) data, comprising: (a) transforming a first set of FTMS data, obtained in the time domain in respect of a mass to charge ratio (m/z) range, into the frequency domain; (b) transforming a second set of time domain FTMS data, different from the first set of FTMS data, into the frequency domain; and (c) correlating the first set of FTMS data in the frequency domain with the second set of FTMS data in the frequency domain so as to identify peaks common to each of the sets of data in the frequency domain.

This aspect of the invention exploits the fact that the noise is essentially random. As such, different parts of a full data set in the time domain, when transformed into the frequency domain, should exhibit peaks at the same relative location, for example, where those peaks are "real" peaks, but peaks in the data resulting from random noise instead should not, statistically, occur at the same place in two separate subsets of the full data set.

The first and second data sets may be obtained from different parts of the same transient (although overlap is possible). Alternatively, the first and second datasets may be subsets of different transients. In the latter case, of course, it is desirable that there is at least partial overlap of the m/z ranges included within each transient so that correlation between the two is meaningful.

In one embodiment, the subsets may overlap one another, for example, the first 25% and the first 50% of the full dataset may be transformed and cross-correlated respectively. Alternatively, separate subsets may be transformed (e.g. the first 25% and the second 25%). Still further, the first and second sets of the time domain FTMS data may be from different transients entirely.

Methods of discriminating peaks in larger molecules, where numerous isotope peaks occur, are also disclosed, which rely upon two thresholds. It will also be understood that the methods disclosed are not simply advantageous because they permit data compression (i.e. by reducing the amount of noise data which may be stored). The correlation approach in particular allows the detection of low intensity "real" peaks even where these appear in a full spectrum, to be of lower intensity than the noise floor.

It is of course to be understood that the first and second aspects of the invention are by no means mutually exclusive. Preferred implementations indeed combine the two aspects. Thus in accordance with a third aspect of the present invention there is provided a method of processing mass spectrometry data comprising: (a) obtaining a set of mass spectrometry data in the time domain in respect of a mass to charge ratio range; (b) transforming a first subset of that obtained time domain data into the frequency domain; (c) transforming a second subset of that obtained time domain data into the frequency domain; (d) transforming substantially the full data set of the obtained time domain data into the frequency domain; (e) applying a first threshold to at least one of the first and second subsets in the frequency domain, to identify one or more regions of that data which contain peak data; and (f) correlating the first subset of data in the frequency domain with the second subset of data in the frequency domain, to identify one or more regions of data common to each of the subsets.

In general terms, the present invention provides an improved thresholding technique for FTMS data, that is, an improved approach to the decision making process by which a peak or spectral area is either included or excluded from the full data set when generating a reduced data set. The invention is based on a mathematical or logical combination of two or more of the following criteria:

1. abundance in a subsection of the data in the time domain (the transient);
2. significant abundance in a different subsection of the same dataset (including overlapping subsections of any kind);
3. abundance in the complete data set;
4. abundance in a different data set;
5. abundance in more than one different data set;
6. phase correlation between peaks qualified by the previous criteria;
7. information about peaks which occur frequently (may be summarised or statistically evaluated);
8. information about peaks which were found in blanks (i.e. spectra generated in the absence of sample ions). These may again be summarized or statistically evaluated.

The significance levels used for the different criteria may be different. The logical operations may be of any type, for example AND, OR, XOR, NOT, implication. Mathematical operations may be multiplication, addition, transformation, comparison of the result with a "master threshold", or otherwise.

BRIEF DESCRIPTION OF THE DRAWINGS

In order that the invention may be more readily understood, reference will now be made, by way of example only, to the accompanying drawings in which.

DETAILED DESCRIPTION OF PREFERRED EMBODIMENTS

In Fourier transform ion cyclotron resonance mass spectrometry (FTMS), as is well known, ions are generated at an ion source and are injected into a measurement cell, usually from a storage device such as a linear ion trap. Application of an homogeneous magnetic field and an rf electric (excitation) field to ions held in the cell cause them to orbit at a cyclotron frequency in that cell. The ions are detected by image currents in detection electrodes in the cell.

Figure 1:
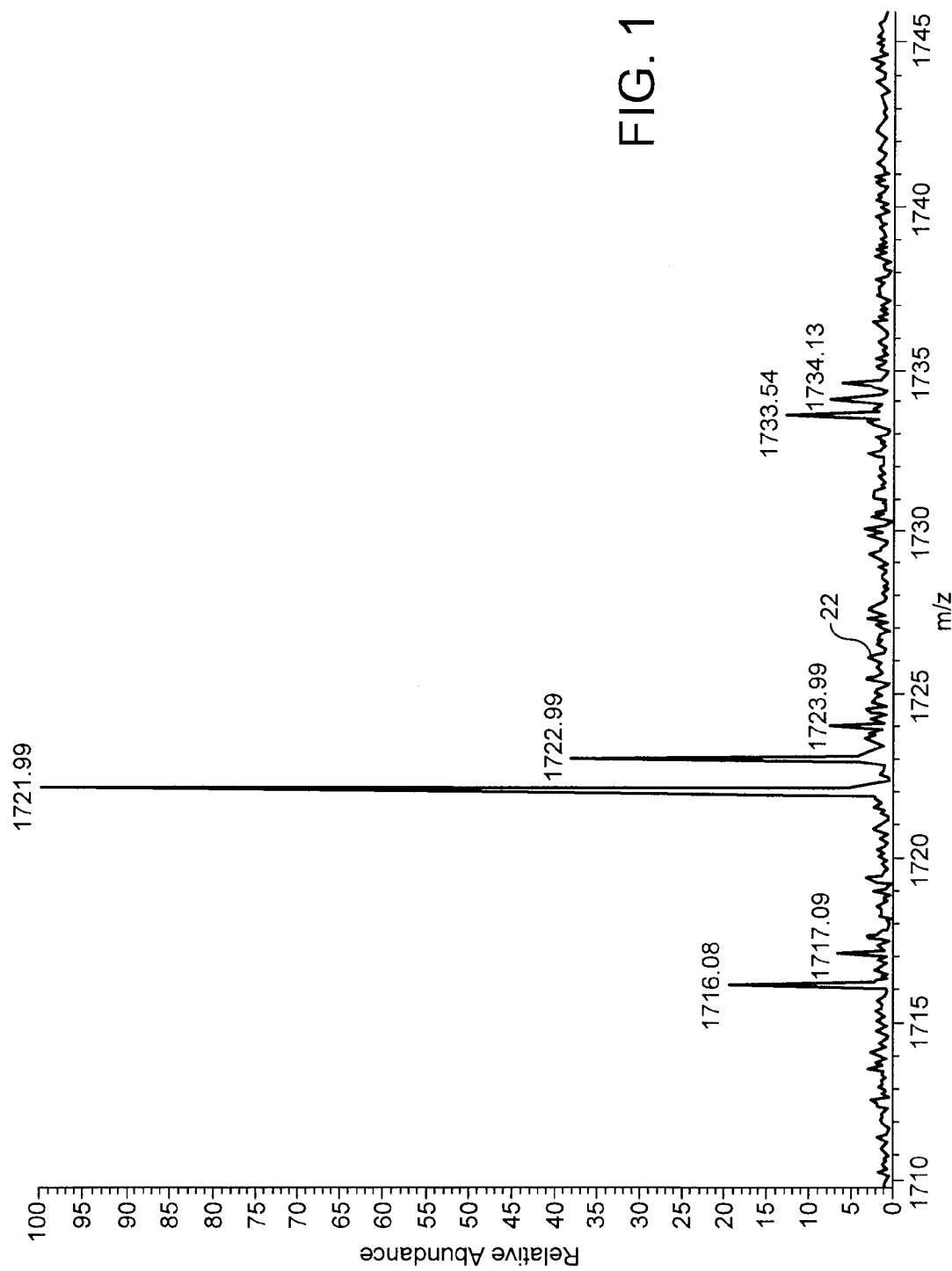
FIG. 1 shows a full FTMS dataset in the form of a mass spectrum, including both peaks resulting from the presence of ions and also random noise.

The raw data which is obtained by this technique is in the time domain and is known as a transient. Once the transient has been obtained, in a prior art FTMS, a mass spectrum is obtained by the following technique. Firstly, the transient is apodised and zero filled. Next, a Fourier Transform of the data into the frequency domain is carried out. This provides a complex frequency spectrum which consists of pairs of values made up of a real and an imaginary part. After that, a magnitude spectrum is obtained point by point using the expression $P=(Im^2+Re^2)^{1/2}$. This is transformed to a mass spectrum by applying a calibration equation. An example of the resulting mass spectrum is shown in FIG. 1. It will be seen that the data includes one or more peaks (labelled with the mass number in FIG. 1) and a large quantity of noise.

Transferring and storing a full FTMS data set is a relatively time consuming task which can require very large storage capacity. Much of the stored information is in fact noise which is analytically of little or no value. To reduce the total volume of stored data, prior art techniques simply applied a threshold to the data in the frequency domain to remove all data points below that threshold. As has been explained in the introduction, for a fixed threshold this is a blunt mechanism as it risks either overcompressing or undercompressing the data so that too much noise remains or true peaks are erroneously removed.

Figure 2:
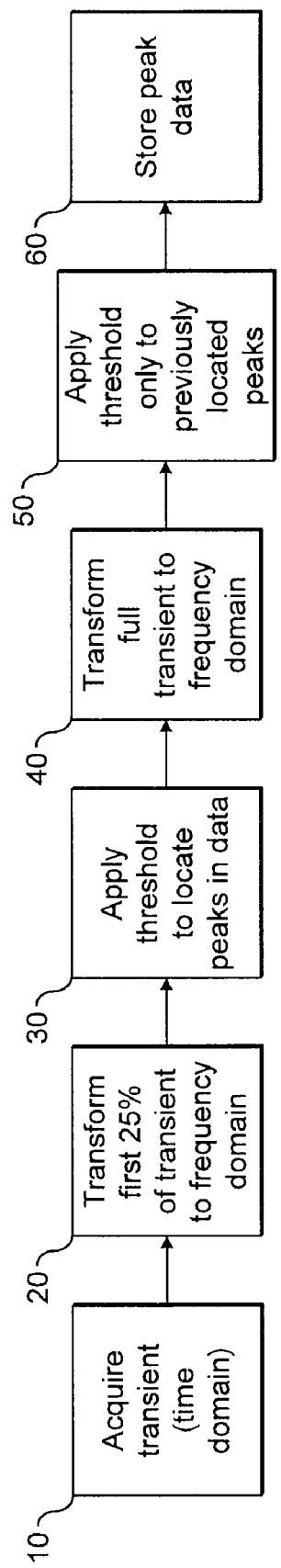
FIG. 2 shows a flow chart of a method of processing FTMS data embodying a first aspect of the invention.

FIG. 2 shows a flow chart of a method of processing FTMS data embodying a first aspect of the present invention. At step 10, a transient in the time domain is acquired by the FTMS in the manner described above. At step 20, part but not all of this transient is Fourier transformed into the frequency domain. The amount of the transient which is Fourier transformed is a trade-off between computational speed and accuracy. On the one hand, transforming a relatively small percentage of the full transient can be completed rapidly. On the other hand, if too small a percentage of the transient is transformed into the frequency domain, true peaks in the data may be lost. The embodiment of FIG. 2 employs 25% of the transient and typically this is the first 25%. The benefit of employing the first 25% is that the processor can commence subsequent processing of that 25% of the transient before the remainder of the full transient has been obtained.

The data in the frequency domain contains peaks representative of the presence of ions having a mass to charge ratio within the range selected for evaluation by the FTMS device. The data in the frequency domain also contains a number of data points which are, in fact, a result of random noise but which may be erroneously determined to be true peaks. However, as explained in the summary of the invention, the number of such peaks reduces with decreasing resolution. Thus, Fourier transforming only 25% of the full transient should reduce the number of random noise peaks.

At step 30, therefore, an intensity threshold is applied to the partial Fourier transform obtained in step 20. The threshold is chosen relatively conservatively to minimise the risk of discarding true peaks. Nevertheless, because of the reduced number of false peaks in the partial data set, the risk of false peaks (that is, random noise peaks) above the intensity threshold being passed is reduced.

Next, at step 40, the full transient is Fourier transformed into the frequency domain. At step 50, then, an intensity threshold is applied to the frequency domain data obtained by Fourier transform of the full transient. This threshold may be the same as the threshold applied in step 30, or may be lower. Importantly, however, the threshold applied at step 50 is only applied in the regions of the frequency domain spectrum (or mass spectrum) around the locations of the true data peaks as ascertained in step 30. In other words, data points between regions of these peaks, which would have fallen below the intensity threshold applied in step 30 are not examined further.

As step 60, the peak data falling above the threshold applied at step 50 is stored. By removing the random noise in this way, a compression of perhaps 90 to 95% or more may be achieved, whilst the data relating to the peaks themselves are not compromised or compressed. Moreover, as is described in our co-pending application no. PCT/EP04/010736, Malek, et al., "Method of Processing and Storing Mass Spectrometry Data", having a priority date of Sep. 25, 2003 since the data between the peaks is assumed to be random noise, a pseudo-spectrum can be reconstituted by assuming that the random noise data is Gaussian distributed and reconstituting that using determined Gaussian parameters.

Figure 3:
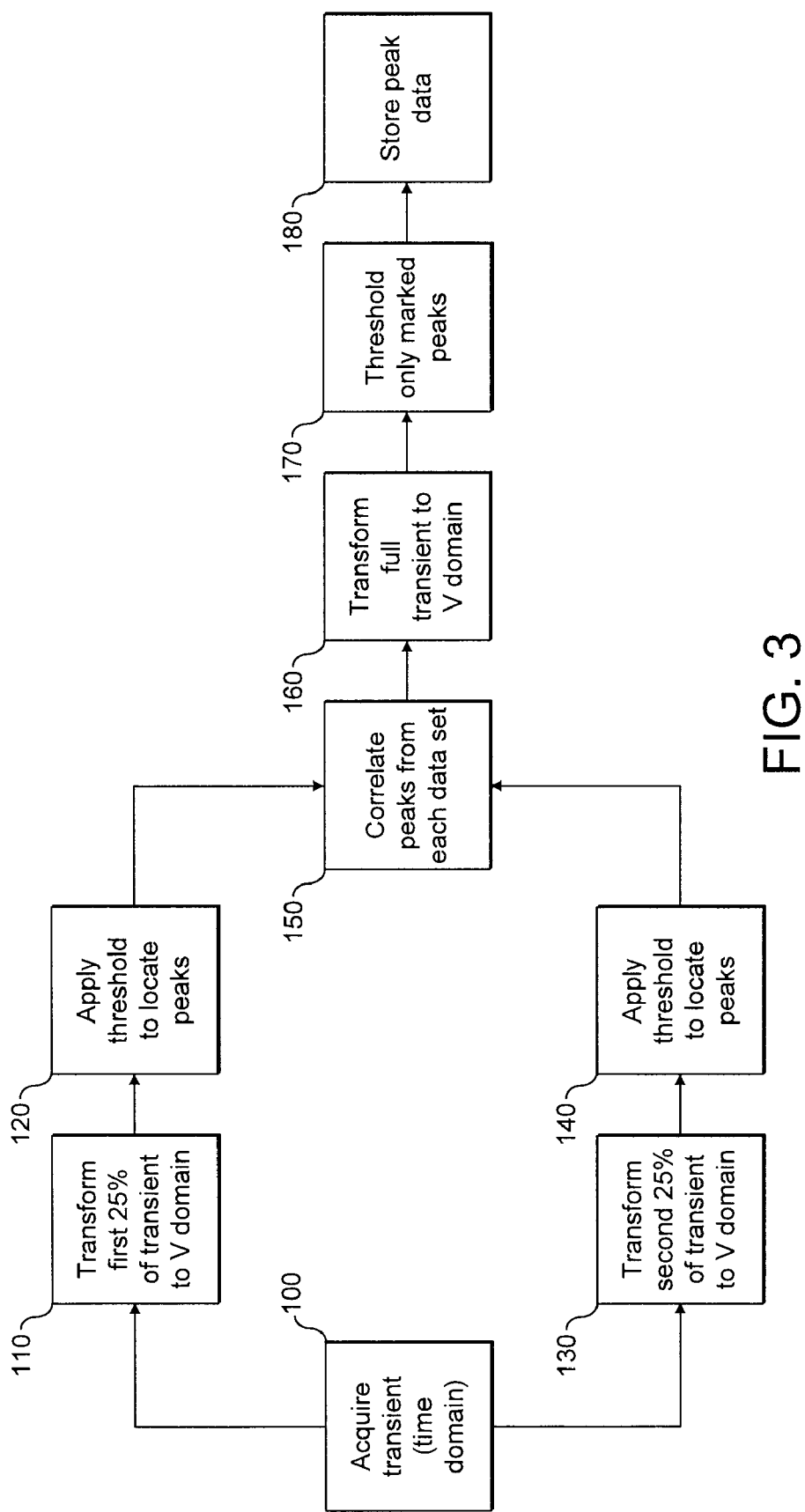
FIG. 3 shows a flow chart illustrating a data processing scheme in accordance with one embodiment of a second aspect of the present invention.

FIG. 3 shows a flow chart of a method of processing FTMS data in accordance with a second embodiment. At step 100, a transient is once more obtained, using the full resolution selected by the operator (that is, a full transient is obtained). Either simultaneously with the collection of the full data transient, or subsequent to that, at step 110 a first 25% of that transient is converted to the frequency domain, as is step 20 of FIG. 2. At step 120 of FIG. 3, an intensity threshold is applied to the first 25% of the transient, now in the frequency domain, in order to locate true peaks in the data. As previously, a relatively conservative threshold may be employed, to minimise the risk of true data peaks being overlooked.

At step 130, a second 25% of the transient is converted to the frequency domain. This may be an overlapping 25% of the original data set, or a subsequent 25% (i.e. 25-50% of the original time domain transient required at step 100). An intensity threshold is then applied to that data as well, once more to identify true data peaks in that data. The threshold applied at step 140 may be the same or different to the intensity threshold applied at step 120. Particularly if a different size of data set is transformed at step 130 relative to step 110 (for example, if 50% of the original time domain transient is transformed at step 130), the threshold applied at step 140 might be slightly higher than the threshold applied at step 120 (since in the latter case there is an increased risk of false data peaks because more of the transient has been Fourier transformed).

At step 150, the data sets acquired as a result of the processing steps 120 and 140 are compared or correlated. Two signals should appear at the same place in each of the spectra obtained following steps 120 and 140. However, assuming that the noise is truly random and not correlated between the different sections of the full time domain data set (transient), then noise peaks will not appear in the same positions in the two different spectra. Thus, by identifying the location of peaks which correlate with one another in the two spectra resulting from steps 120 and 140 respectively, and by discarding regions of data where the peaks do not match, a "prefilter" to the total data set can be generated.

At step 160, then, the full transient is Fourier transformed into the frequency domain. The threshold (which may be higher than the threshold applied at step 120 and 140 to the partial data set) is applied to the full transient in the frequency domain, but only in the region of the peaks identified using the prefiltering techniques of steps 100 to 150. The stored peak data, that is, the data above intensity threshold applied at step 170, is stored at step 180. As with the embodiment of FIG. 2, the discarded random noise can be reconstituted by assuming that it is Gaussian distributed.

Although, currently, it is preferred to apply a relatively "loose" threshold to the transformed partial transients (steps 120 and 140) it will be understood that this is not an essential step. Whilst it is computationally expensive, it is possible to correlate all of the data from each data subset, not just the threshold data; this procedure would reduce the risk of true peaks being missed.

Figure 4:
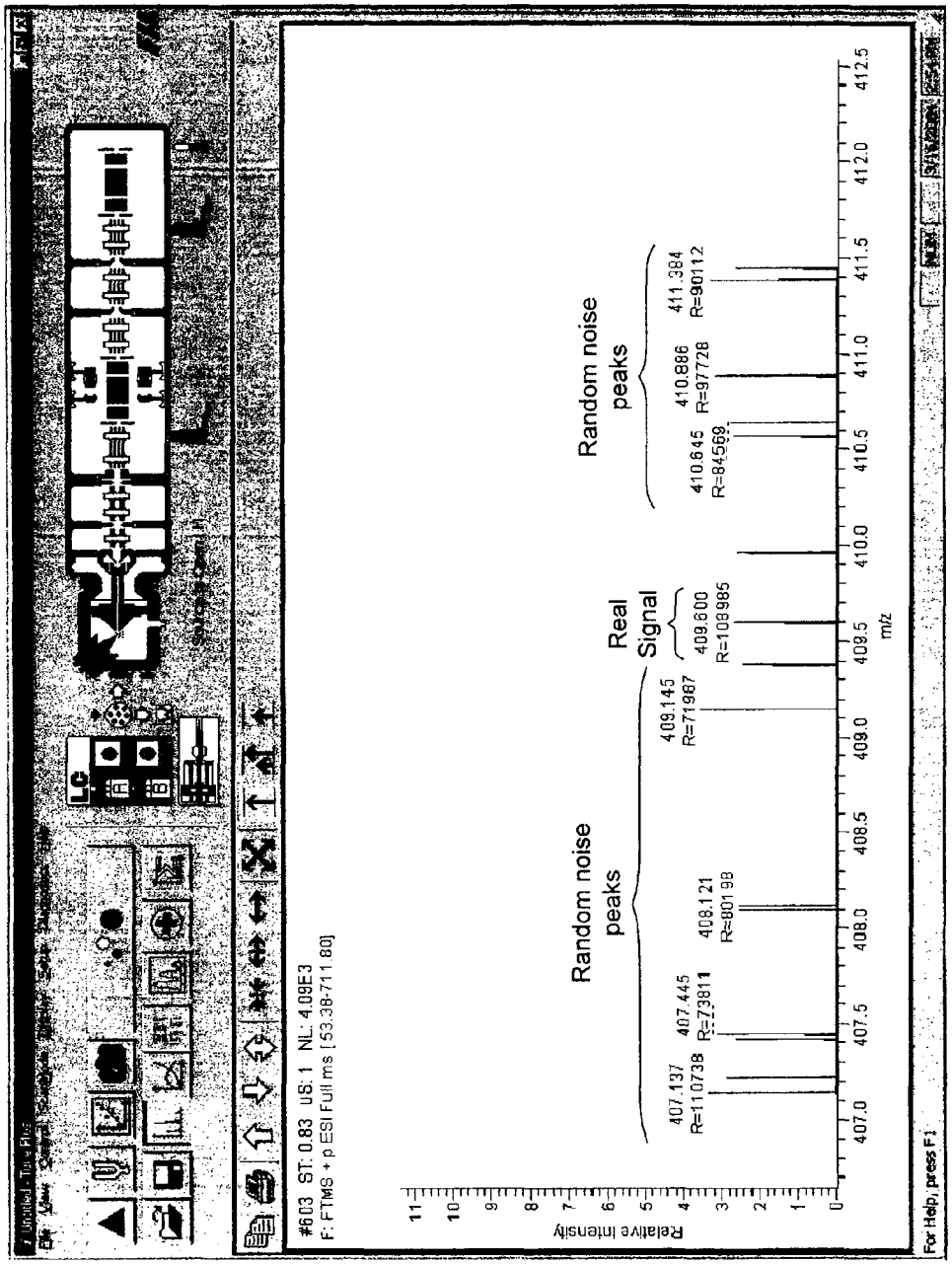
FIG. 4 shows a Fourier Transform Mass Spectrum produced using a thresholding technique in accordance with the prior art.
Figure 5:
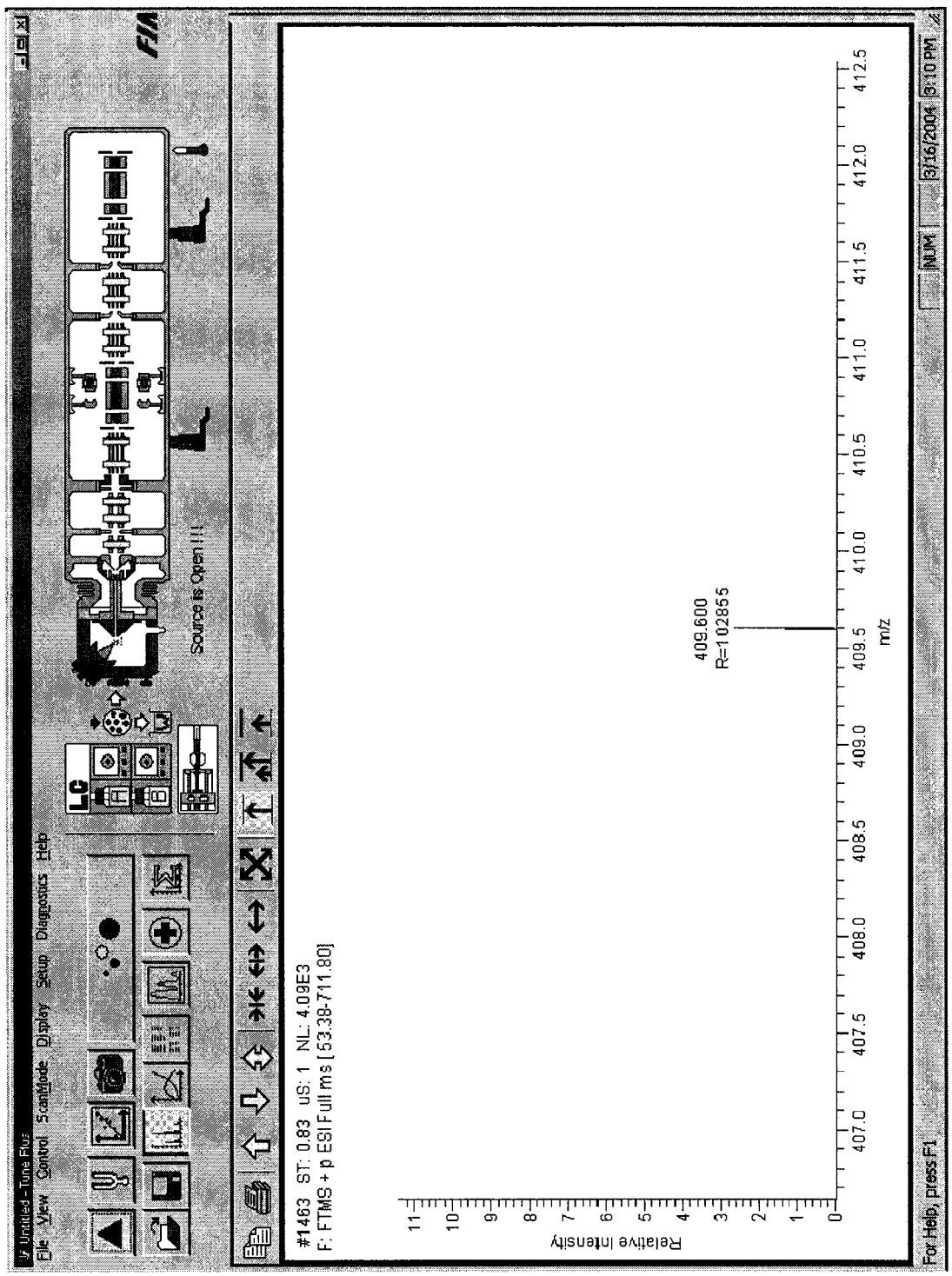
FIG. 5 shows a Fourier Transform Mass Spectrum produced using the improved thresholding technique of embodiments of the present invention.

The advantages of the method of FIG. 3 are illustrated in FIGS. 4 and 5. FIG. 4 shows an artificial time domain signal including a "real" peak at 409.6 kHz and a plurality of random noise peaks at other locations around the real signal peak. The intensity of the real signal at 409.6 kHz is just above the intensity threshold.

FIG. 4 shows the results of application of the prior art technique wherein the threshold is applied to the full Fourier transformed transient without any prefiltering. Relative to FIG. 1, which is a full mass spectrum, it will be seen that FIG. 4 does not contain the "base line" noise (which has been removed through the application of the threshold) but there are 14 random noise peaks, a number of which have a higher intensity than the real signal at 409.6 kHz.

Applying the improved scheme of FIG. 3, wherein the first and second quarters of the full time domain data set are transformed separately, a list of "valid" peaks is created, through inspection of the separate frequency domain transforms from the time domain transient. FIG. 5 shows the results of the comparison. All of the peaks due to random noise have disappeared, whilst the one valid signal in this region of mass to charge ratios remains. It is notable that the real signal remains even though it has a lower intensity than any of the random noise peaks in FIG. 4. Thus it is to be appreciated that the method described herein is not simply restricted to reducing the data set size in order to allow reduced quantities of data to be stored (such as in step 180 of FIG. 8 as described above). The method can also be used to generate the data sets of comparable size to the standard method, but with a much lower detection threshold. This will allow the detection of signals which are currently below the simple intensity threshold, without increasing the total volume of data. Although, in FIG. 3, the location of the peaks in the two data subsets is used to identify real peaks in the data, other parameters can be correlated instead or as well, to identify the true peaks in the data. For example, the intensity of the peaks can be correlated between the two data subsets (so that matching peak intensities are identified as "true" peaks). Additionally or alternatively, the phase for real signals will be consistent from one segment of the transient to the next, whilst the phase for random signal should, by contrast, be random. Thus, the phase consistency can be used as an additional or alternative factor. If the charge state can be determined for a signal, then the position of associated isotope peaks can be predicted. The window of these isotopes can then be included in the final thresholding region, as a further improvement. As still a further improvement, data from more than one data set can be employed. This idea is explained further in connection with FIG. 8 below. In preferred embodiments position and phase (at least) are both employed.

Figure 6:
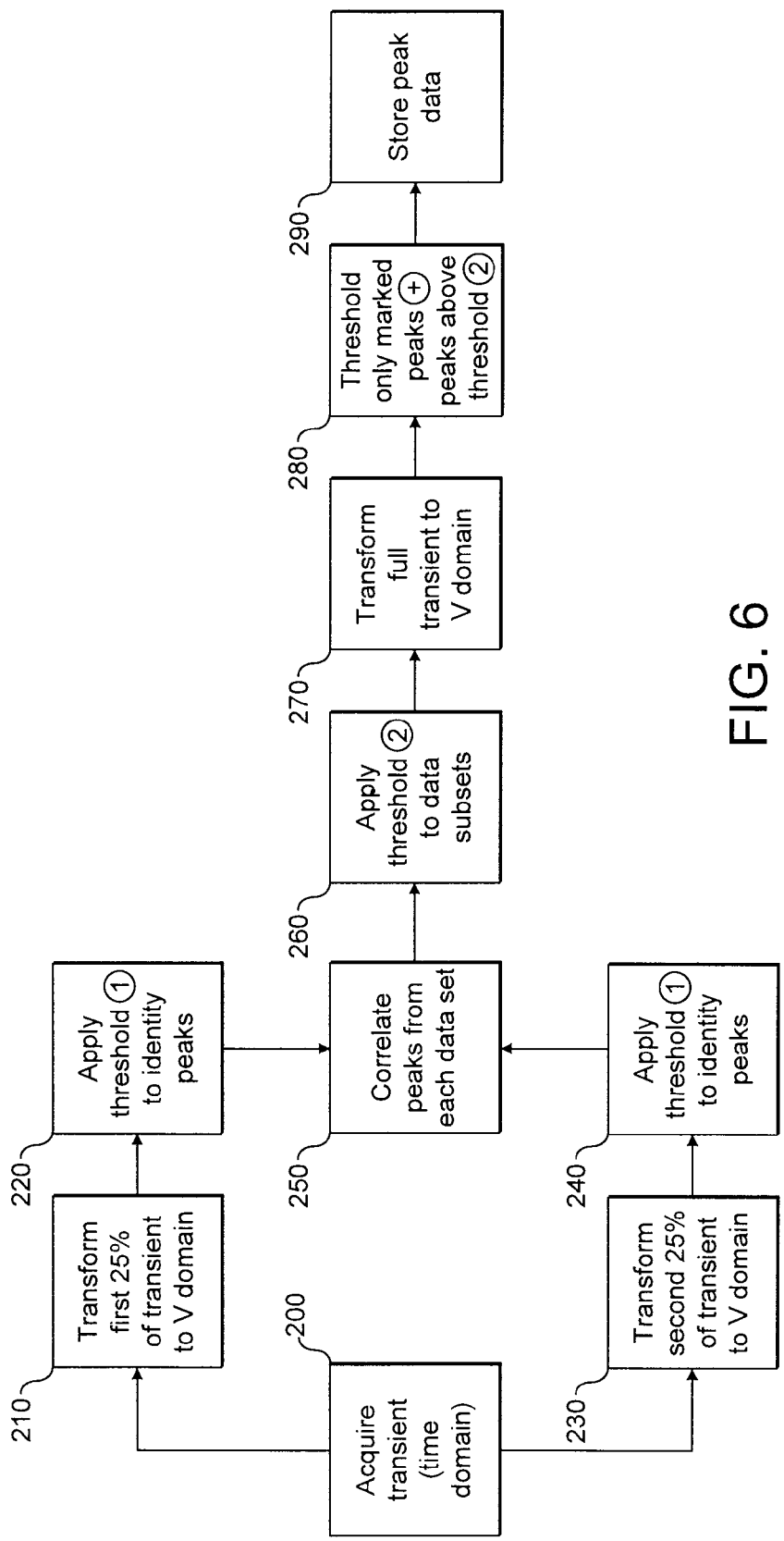
FIG. 6 shows a flow chart illustrating a data processing scheme in accordance with a further embodiment of the second aspect of the present invention.

FIG. 6 shows still a further embodiment in accordance with the present invention. The embodiment of FIG. 6 includes a further modification to the embodiment described in FIG. 3, to address peculiarities with certain signals. Specifically, larger molecules produce an unusual time domain signal or transient. Due to the numerous equally spaced isotope peaks, a strong "beat pattern" can be produced (see Hofstadler et al. "Isotopic beat patterns in Fourier transform ion cyclotron resonance mass spectrometry: implications for high resolution mass measurement of large biopolymers", International Journal of Mass Spectrometry & Ion Processes 132:109-127 (1994). Using the two-segment threshold approach described in FIG. 3, one of the two time domain data segments may correlate with an "anti-node" of the full time domain data. Therefore, no above threshold signals would appear in this segment, and thus, no "common" peaks would occur, even though strong signals may appear in one of the two data sets. There is no way to predict the position of antinodes ahead of time, so there is no way of guaranteeing that an antinode would not appear in any selected subsection of the time domain transient. The solution to this problem is to use two separate thresholds.

Referring to FIG. 6, at step 200 a full transient is required as previously. At step 210 a first 25% of the transient is transformed to the frequency domain and, then, at step 220, a first, low intensity threshold (threshold 1) is applied to identify peaks of this threshold. A similar technique is applied to a second 25% of the transient, once it has been converted to the frequency domain, as shown in step 230. Threshold 1 is applied to this frequency domain date to identify peaks in it, at step 240.

At step 250, the two data sets from steps 220 and 240 are correlated to identify common peaks. However, at step 260, a higher threshold (threshold 2) is also applied to the data subsets obtained following steps 220 and 240, so that large peaks (which are assumed to be real peaks) are not discarded erroneously because of the strong beat pattern described above.

Once the modified prefilter has been generated, that is, the location of true peaks has been determined at step 260, at step 270 the full transient is transformed to the frequency domain, and then, at step 280 a third threshold is applied to the full data transform in the data domain, but only in the regions determined following step 250 and 260. As previously, the peak data may be stored at step 290.

Of course, although two partial transforms of similar magnitude have been described, data subsets in the time domain of differing magnitudes can be employed, and/or overlapping data sets.

Figure 7:
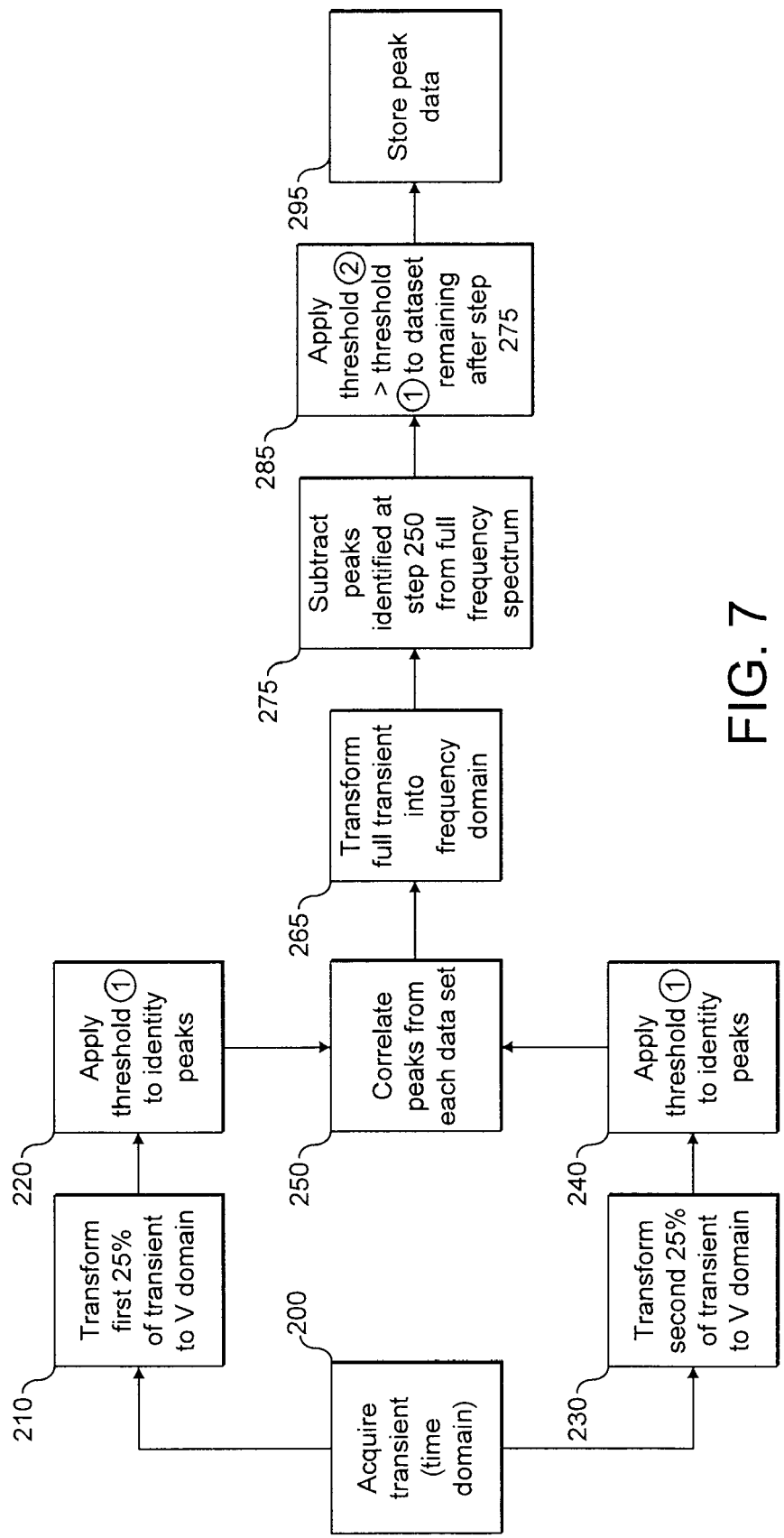
FIG. 7 shows a flow chart illustrating a data processing scheme similar to that of FIG. 6 but with some variants.

A slightly modified approach to that of FIG. 6 is shown in FIG. 7. Because of the similarity between FIGS. 6 and 7, like reference numerals are employed to denote analogous steps.

In particular steps 200 to 250 are the same in FIGS. 6 and 7, that is, two separate fractions of the transient are transformed into the frequency domain, peak detected using a first, relatively low threshold (threshold 1) and then correlated to locate peaks that match in each data set.

At step 265, however, instead of applying a higher threshold to each data subset, the whole transient is transformed into the frequency domain as a next step. Then, at step 275, the regions identified as peaks via steps 200-250 are subtracted or otherwise excluded from full frequency domain data set. At step 285, the remaining data set is subjected to a second threshold which is higher than the first threshold. This makes sure that no peak is omitted from the full spectrum if it reaches this second threshold, even if the pre-processing steps failed to locate that threshold.

At step 295, the data from the full data set in the frequency domain is stored but only in the regions which are identified to be peaks through the combination of correlation pre-processing (steps 200-250) and higher level threshold processing of the remaining data.

Figure 8:
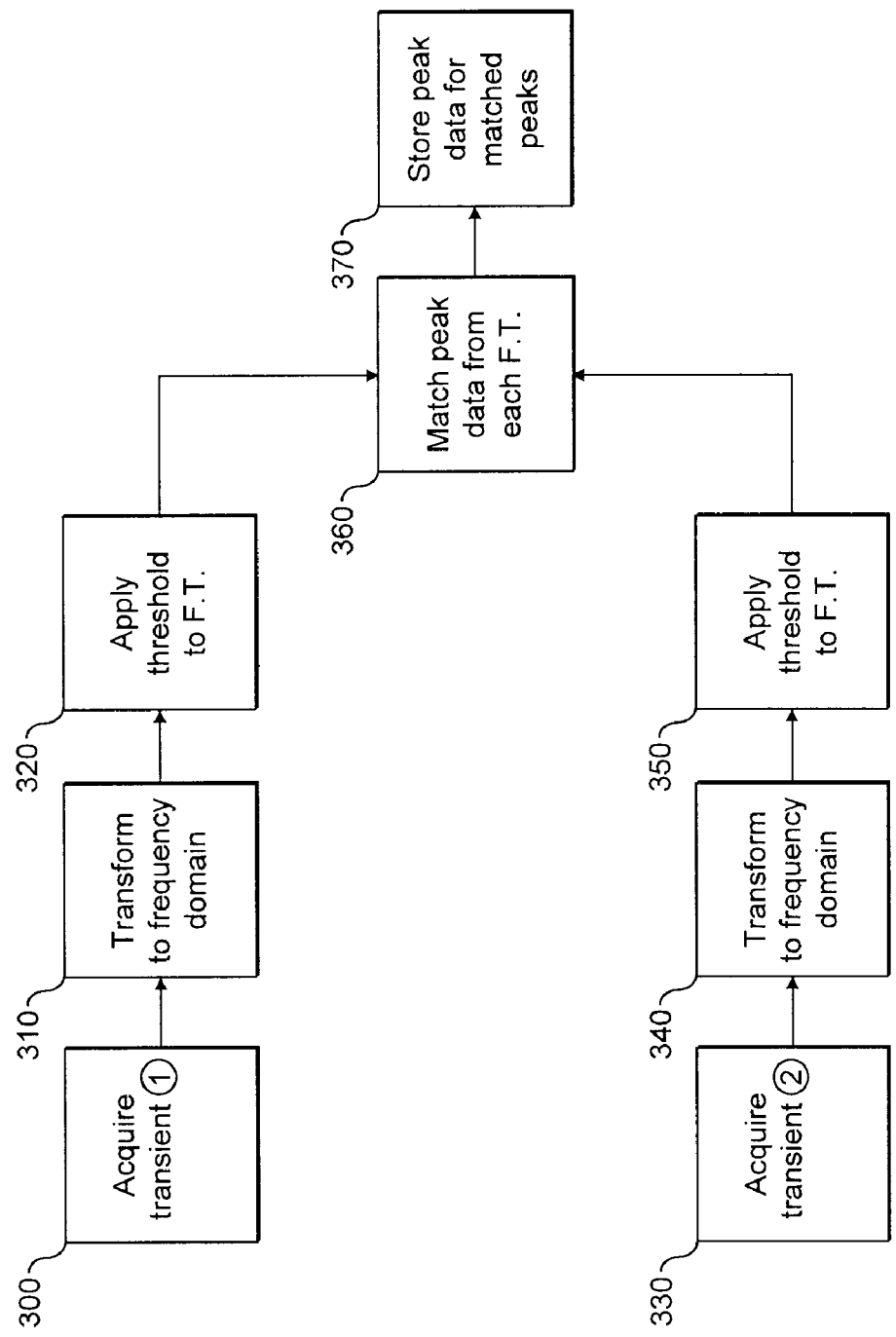
FIG. 8 shows a flow chart illustrating still a further embodiment of the second aspect of the present invention.

Still a further embodiment is illustrated in the flow chart of FIG. 8. Here, peaks from two completely separate time domain data sets are correlated. Starting at step 300, following injection into the FTMS cell of a first set of ions from a sample (usually via an upstream ion filter/ion storage arrangement) the first transient is acquired from those sample ions. This is transformed at step 310 to the frequency domain, and at step 320, a threshold is applied to the Fourier transform in the frequency domain. At step 330, a second transient is acquired. Typically, this is obtained from a fresh set of ions injected into the FTMS cell following the collection of the first transient and the subsequent emptying of the cell of those ions that created that first transient. The second transient is transformed to the frequency domain at step 340. The threshold is applied to that Fourier transform in the frequency domain as well, at step 350.

The threshold applied at steps 320 and 350 may be the same or different. Likewise, although the first and second transients acquired at steps 300 and 330 respectively may be converted in their entirety into the frequency domain, instead only a part of each separate transient may be converted into the frequency domain at steps 310 and 340 before the threshold is applied. Also, although typically the mass range of the sample ions from which the first transient is obtained corresponds with the mass range of the sample ions that provides the second transient, the mass ranges do not need to be identical. By adjusting the parameter of the upstream ion filter/trap, different mass ranges can be injected into the FTMS cell although, of course, they must at least overlap.

At step 360, correlation or matching data from each Fourier transform takes place (which is why the mass ranges from which the two transients are obtained must at least partially overlap). From this, the location of true peaks is identified, and the data in respect of those true peaks may be stored at step 370. Assuming the full transient is transformed in step 310 and 340, the two step process of the embodiments of FIGS. 3 and 6 is avoided. However there are some drawbacks to the embodiment of FIG. 8. Specifically, processing of the first data set cannot be completed unless the second data set has been collected.

Various further embodiments will be apparent to the skilled reader, for example, rather than relying upon part of the same transient, or different transients, for sample ions (whether of known m/z or not), it is possible to analyse a "blank" spectrum instead (i.e., in the absence of any sample ions). Typically this might be done upon start up of the FTMS device. At this time, resident noise peaks may be sought in the absence of ions in the FTMS measurement cell. The location of any such resident noise peaks is stored. In general, as explained above, the system software looks for peaks in different spectra but with varying phase; these out of phase signals are then subtracted out of the spectrum. One benefit of this is to reduce single frequency electronics noise (a major source of false/noise peaks in the system), along with the white noise that can be addressed according to embodiments of this invention.

Although embodiments of the invention have been described in connection with the analysis of transients produced by ion cyclotron resonance, it is to be understood that the invention is by no means so limited, for example, the invention is equally applicable to data obtained from FT-IR, FT-NMR, or SAR, electrostatic traps such as the Orbitrap (see U.S. Pat. No. 5,886,346), which is captured as a time domain transient for ultimate Fourier Transformation (usually) into a mass spectrum. The ideas are also suitable for application to data obtained from electrodynamic traps such as are described in U.S. Pat. No. 4,755,670 and U.S. Pat. No. 6,403, 955. Indeed, the invention would be applied to the output of electrostatic time of flight (TOF) mass spectrometers (see, for example, Benner, W. H. (1997) "A Gated Electrostatic Ion Trap To Repetitiously Measure the Charge and m/z of Large Electrospray Ions" Analytical Chemistry 69, pages 4162-4168. Moreover, Fourier transforms are not the only forms of frequency transforms that can be employed: the invention can equally be used with Hadamard transforms or Laplace transforms, for example. See also A. Brock, N. Rodriguez, and R. N. Zare, "Hadamard Transform Time-of-Flight Mass Spectrometry (HT-TOFMS)" Anal Chem. 70, 3735-3741 (1998). Thus, it will be understood that the invention is in fact applicable to any MS method which produces a periodic signal.

The invention claimed is:

1. A method of processing mass spectrometry data, comprising:
    generating from an ion source a set of mass spectrometry data in the time domain with respect to a mass to charge ratio range;
    transforming a subset of that obtained time domain data into the frequency domain generating a frequency data subset;
    applying a first threshold to the frequency domain data subset to discriminate noise data from peak data indicative of the presence of ions having a mass to charge ratio with the range generating a peak data subset;
    transforming substantially the full data set of the obtained time domain data into the frequency domain generating a transformed full data set; and
    comparing the transformed full data set and the peak data subset to identify regions that contain peak data.

2. The method of claim 1, further comprising:
    storing and/or displaying the data from the transformed full data set which is within the regions identified in the comparing, and rejecting data outside those regions as noise.

3. The method of claim 1, further comprising applying a second threshold to the transformed full data set in the frequency domain, but only in the identified regions thereof.

4. A method of processing mass spectrometry data, comprising:
    generating from an ion source a full data set of mass spectrometry data in the time domain with respect to a mass to charge ratio (m/z) range;
    transforming a first set of mass spectrometry data, wherein the first set is first portion of the full data set of mass spectrometry into the frequency domain generating a first frequency domain data subset;
    applying a first threshold to the first frequency domain data subset to discriminate noise data from peak data indicative of the presence of ions having a mass to charge ratio with the range generating a first peak data subset;
    transforming a second set of time domain mass spectrometry data, wherein the second set is a second portion of the full data set of mass spectrometry data, into the frequency domain;
    applying a second threshold to the transformed second set to discriminate noise data from peak data indicative of the presence of ions having a mass to charge ratio with the range generating a second peak data subset; and
    correlating the first and the second peak data subsets so as to identify peaks common to each of the sets of data in the frequency domain.

5. The method of claim 4, wherein the first and second sets of mass spectrometry data in the time domain each comprise different subsets of a full data set in the time domain, the method further comprising, after correlating the first and second peak data subsets:

transforming substantially all of the full data set from the time domain into the frequency domain; and applying to the transformed full data set the first threshold which discriminates noise data from peak data indicative of the presence of ions having a mass to charge ratio within the range, the first threshold being applied only in the region of the peaks.

6. The method of claim 5, further comprising rejecting, as noise data, the data in the transformed full data set outside of the region of each identified peak.

7. The method of claim 5, wherein the said first and second time domain data sets are substantially non-overlapping subsets of the full data set in the time domain.

8. The method of claim 5, wherein the first and second time domain data sets overlap with one another.

9. The method of claim 8, wherein the first data set in the time domain is a subset of the second data set or vice versa.

10. The method of claim 5, wherein the at least one of the first and second sets of mass spectrometry data is not a subset of the full data set.

11. The method of claim 5, wherein after correlating the first and second peak data subsets to identify peaks indicative of the presence of ions having a mass to charge ratio within the range, the method further comprises, prior to the transforming:

applying to at least one of the first and second peak data subsets a second threshold, higher than the first threshold, to identify peaks indicative of the presence of ions having a mass to charge ratio within the range but which are not located through correlating the first and second data sets.

12. The method of claim 5, wherein, correlating the first and second data peak data subsets to identify peaks indicative of the presence of ions having a mass to charge ratio within the range, the method further comprises, prior to the applying to the transformed full data set:

subtracting from the full data set, the data relating to each identified peak; and applying the second threshold to the remaining data in the full data set.

13. The method of claim 4, wherein correlating the first and second peak data subsets comprises:

comparing the position of peaks in the first set of mass spectrometry data in the frequency domain with the position of peaks in the second set of mass spectrometry data in the frequency domain; and identifying those peaks which have substantially the same location in each of the first and second sets of frequency domain data.

14. The method of claim 4, wherein correlating the first and second peak data subsets comprises:

comparing the phase of peaks in the first set of mass spectrometry data in the frequency domain with the phase of peaks in the second set of mass spectrometry data in the frequency domain; and identifying those peaks with a phase which is consistent between each of the first and second sets of frequency domain data.

15. The method of claim 4, wherein correlating the first and second peak data subsets comprises comparing substantially all of the mass spectrometry data in the first frequency domain set with substantially all of the mass spectrometry data in the second frequency domain set.

16. The method of claim 4, wherein correlating the first and the second peak data subsets comprises:

applying to the first peak data subset in the frequency domain the first threshold;

applying to the second peak data subset in the frequency domain the second threshold; and comparing the data in the first peak data subset which is above the first threshold, with the data in the second peak data subset which is above the second threshold.

17. The method of claim 16, further comprising storing the peak data which exceeds the first threshold and also the peak data which exceeds the second threshold, and rejecting as noise the remaining data from the full data set.

18. The method of claim 4, further comprising:

storing only the peak data from the full data set following application of the first threshold.

19. A method of processing mass spectrometry data comprising:

generating from an ion source a set of mass spectrometry data in the time domain with respect to a mass to charge ratio range;

transforming a first subset of the set of mass spectrometry data into the frequency domain;

transforming a second subset of the set of mass spectrometry data into the frequency domain;

transforming substantially the full set of mass spectrometry data into the frequency domain;

applying a first threshold to at least one of the first and second subsets in the frequency domain, to identify one or more regions of that data which contain peak data; and correlating the first subset of data in the frequency domain with the second subset of data in the frequency domain, to identify one or more regions of data common to each of the subsets.

20. The method of claim 19 further comprising identifying one or more regions of data in the transformed full data set which correspond with the or each region identified by the applying or the correlating.

21. The method of claim 20, further comprising storing the regions of data from the transformed full data set identified by the applying and/or the correlating.

22. The method of claim 19, further comprising identifying one or more regions of data in the transformed full data set which correspond with the or each region identified by the applying and also by the correlating.

23. A non-transitory computer-readable medium having instructions encoded thereon for carrying out the method of:

generating from an ion source a full set of mass spectrometry data in the time domain with respect to a mass to charge ratio (m/z) range;

transforming a first set of mass spectrometry data, wherein the first set is a first portion of the full set of mass spectrometry data into the frequency domain generating a first frequency domain data subset;

applying a first threshold to the first frequency domain data subset to discriminate noise data from peak data indicative of the presence of ions having a mass to charge ratio with the range generating a first peak data subset;

transforming a second set of time domain mass spectrometry data, wherein the second set is a second portion of the full set of mass spectrometry data, into the frequency domain;

applying a second threshold to the transformed second set to discriminate noise data from peak data indicative of the presence of ions having a mass to charge ratio with the range generating a second peak data subset; and correlating the first and the second peak data subsets so as to identify peaks common to each of the sets of data in the frequency domain.

* * * * *